Aug. 3, 1965   B. F. MAJESKI   3,198,571
DUAL PURPOSE VEHICLE
Filed May 14, 1963   3 Sheets-Sheet 1
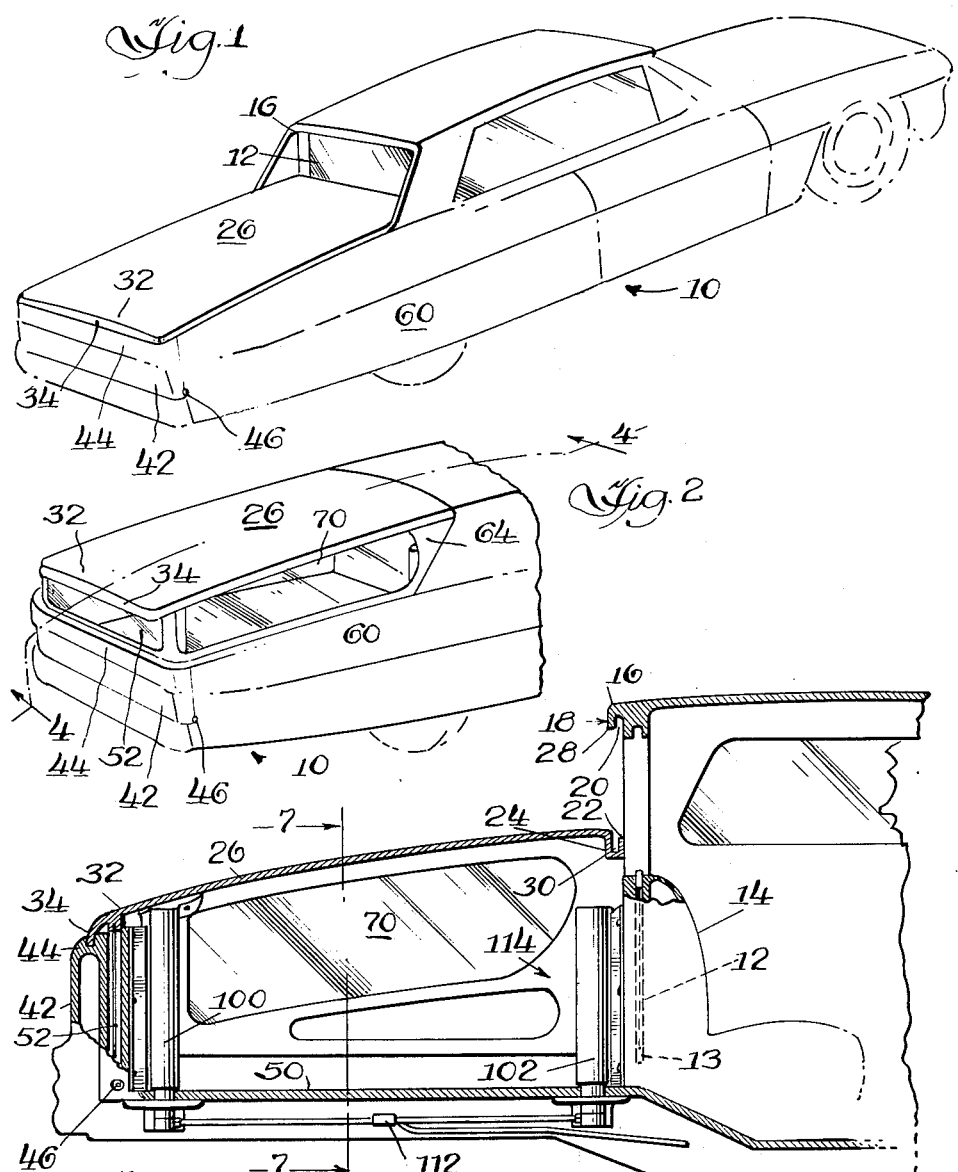
Inventor,
Bruno F. Majeski,
By: T. B. Slisz
Atty.

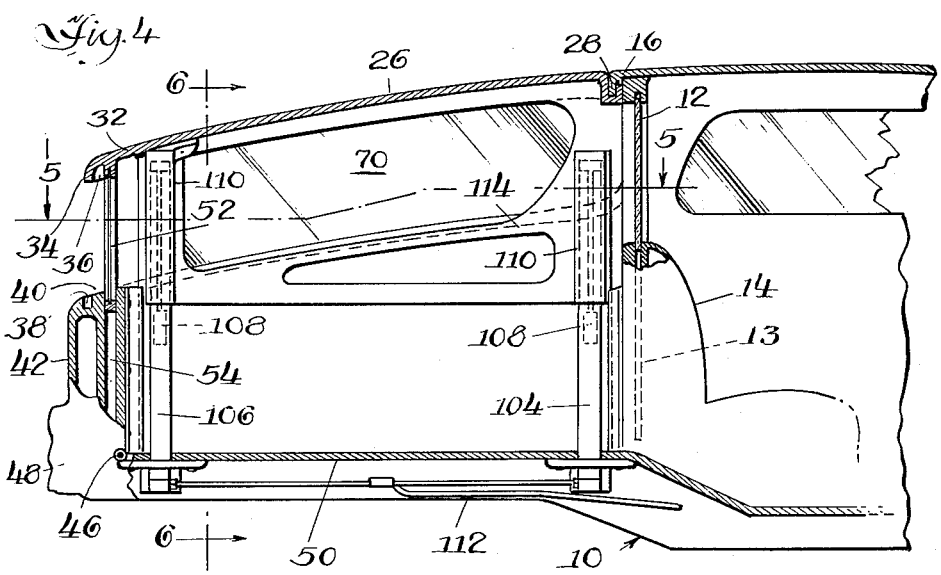
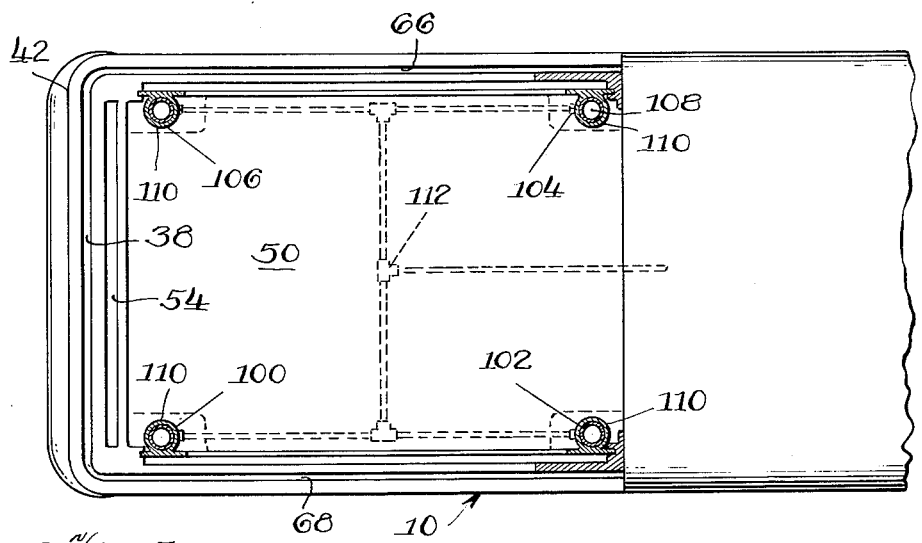

Aug. 3, 1965   B. F. MAJESKI   3,198,571
DUAL PURPOSE VEHICLE
Filed May 14, 1963   3 Sheets-Sheet 3
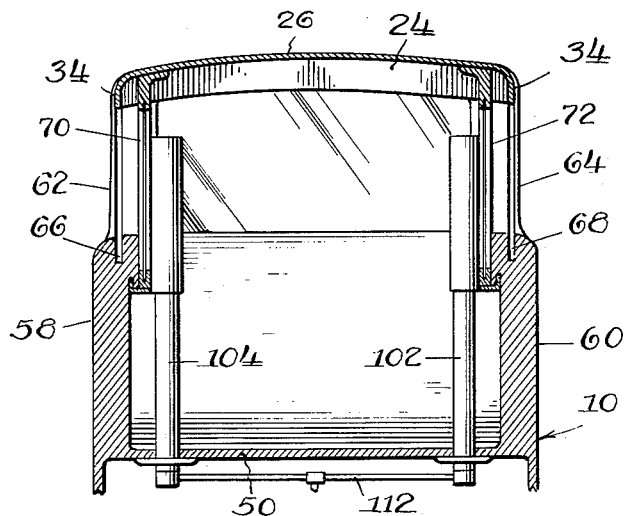
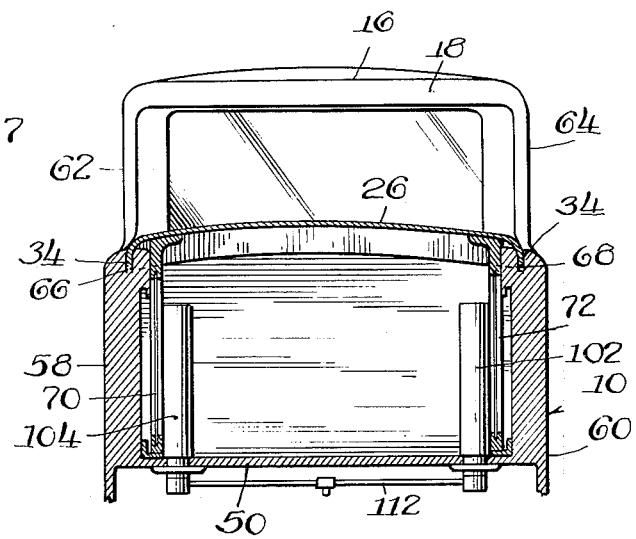
Inventor,
Bruno F. Majeski,
By T. B. Slisz
Atty.

United States Patent Office 3,198,571
Patented Aug. 3, 1965

3,198,571
DUAL PURPOSE VEHICLE
Bruno F. Majeski, 4115 W. Arnold Place, Oak Lawn, Ill.
Filed May 14, 1963, Ser. No. 280,219
4 Claims. (Cl. 296—26)

This invention pertains to automotive vehicles. More particularly it is directed to the greater utilization of certain types of automotive passenger vehicle bodies and to greatly extend the range of usefulness. Specifically, it is directed to a dual purpose automotive vehicle body that can be easily converted from a conventional tonneau to a station wagon body or vice versa.

Normally commercially available passenger automobiles are designed to carry exclusively passengers. Some concessionally provide a "trunk" in which the spare tire is dumped without furthering the best utilization of the so called "trunk" space. In addition, loading into and unloading from the so called "trunk" is a laborious task of raising and lowering the bulky contents that requires strength, time and intelligence consuming operation. This becomes more aggravating when touring the country with the family since everything is placed within the trunk to utilize every cranny. Also there are times when more trunk space is necessarily desirable, particularly to haul shrubs, merchandise, Scouts, little Johnnie's play pen or the like. Under those conditions, the so called station wagons become a convenience which is unavailable unless paid for in a separate body and style of automobile.

Accordingly, it is an object of my invention to provide an automobile that for all purposes appears realistically as a normal automobile or as a normal station wagon with very little change.

A further object of my invention is to provide an automotive vehicle body that can serve as a dual purpose vehicle such as a station wagon with all of its efficiency and economy, or as a conventional passenger automobile.

Another object of my invention is to provide a means by which a normal appearing automobile can readily be converted to a station wagon useful for the rougher transportation duties or remain an automobile passenger car adapted for the normal and gentler conventional uses.

A still further object of my invention is to provide a method by which a conventional automobile body of a recent design can be readily converted to a station wagon not only in appearance but also in function.

Another but not final object of my invention is to provide an automobile body having a dual function, at low cost and ready convertibility into a station wagon or vice versa.

These and other objects, variations, modifications, extensions and adaptations will be readily apparent to those skilled in this art, particularly in view of the clear, concise and definitive description given hereinbelow of the underlying principles of my invention as specifically applied for illustrative reasons only to a preferred embodiment of my invention, which is further illustrated in the annexed drawings forming a part of this disclosure.

In the drawings, FIGURE 1 is a perspective view of an automobile in which the preferred embodiment of my invention is included.

FIGURE 2 is a broken away rear portion of the automobile in FIGURE 1 converted to a station wagon body.

FIGURE 3 is a vertical section taken substantially along line 4—4 but with the roof in the trunk lid position.

FIGURE 4 is a section taken along line 4—4 of FIGURE 2.

FIGURE 5 is top section taken along line 5—5 of FIGURE 4.

FIGURE 6 is a section taken along line 6—6 of FIGURE 4, while

FIGURE 7 is a section taken along line 7—7 of FIGURE 3.

For sake of convenience and clarity in the description, certain numerical characters are employed in the drawings to designate certain elements thereon. These numeral characters are used hereinbelow to serve as reference numbers.

My invention comprises essentially a conventional appearing passenger automobile body 10 like a four door sedan, hard top or two door automobile. Depending on the slope of the rear window or glass wall 12, there is provided suitable channels 13 within the rear seat back cushion 14 within which the glass pane 12 is retracted or elevated by well known conventional means not forming a part of this invention.

Extending beyond the rear portion of the automobile roof top edge 16 is an overhanging inverted U shaped channel 18 forming preferably an integral part thereof and having therein a longitudinal groove 20 which mates with the upright ledge 22 of the channel edge 24 forming preferably an integral part of the trunk lid or station wagon roof top 26.

The downwardly projecting leg 28 of U shaped channel 18 likewise mates within the groove 30 formed within the roof deck forward edge channel 24. Thus when the roof and trunk deck 26 is in the upright position, both ledge channels 18 and 24 intergage to form a tight waterproof seal particularly when a proper gasket material is employed within the said slots. This gasket material may consist of well known seals, including rubberized forms, plastic extrusion and others used in this industry. For sake of clarity these are omitted from the illustrations forming a part of this disclosure since they are well known in this industry.

The deck 26 serves in a dual capacity either as a trunk lid or as the top of a portion of the station wagon.

Similarly on the rear edge portion of 32 of roof-lid member or deck 26, there is provided a downwardly projecting inverted U-shaped channel 34 substantially enclosing a longitudinal slot 36. The projecting arms of channel 34 and the longitudinal slot 36 are in a meshing juxtaposition relationship with a longitudinal recess 38 and abutment 40 forming the upper part 44 of the trunk door or tail gate 42 which is movably attached at its lowermost edge 48 by suitable hinges 46 to the body floor 50 of the trunk.

A suitable arrangement intentionally omitted for sake of clearness and not a part of this invention is provided to raise and lower the glass pane 52 within the recessed space 54 of the tail gate 42.

A similar seal groove and ledge arrangement is provided along the sides 58 and 60 respectively of the rear portion of the automobile body 10 as shown in FIGURES 6 and 7.

The entire roof deck or trunk lid assembly 26 comprising the sides 62 and 64 as well as the forward and rear ends 22 and 32 respectively fit into and are engageable within their respective longitudinal recesses 66, 68, 38 and 20. These are suitably sealed to provide weather tight construction. Glass panes 70 and 72 are provided and these are attached to roof-lid assembly 26. These likewise have provision for raising and lowering the glass panes which are well known in this art. Since they form no part of this invention, they likewise for sake of clarity are not shown in the illustration.

The entire roof-lid assembly 26 is supported at the respective corners on a means to raise and lower the said roof-lid assembly 26. Though for convenience and simplicity only a hydraulic lifting means is illustrated, it is clear to those skilled in the this art that other means may very well be used and substituted. Therefore, it is not intended to be limited to the particular means illustrated. In the preferred embodiment hydraulically operated cylinder engines 100, 102, 104 and 106 respectively are provided. These support the roof-lid assembly 26 at each corner thereof. The pistons 108 are enclosed in suitable protective sleeves 110 to prevent catching of clothes, equipment etc., contained in the back of the automobile. These slide telescopically over their respective cylinders 100 to 106 inclusively.

The cylinders are rigidly attached to the floor 50 of the trunk in the respective corners of said trunk. If necessary, vertical channels (not shown) may be provided to slide the roof assembly 26 up or down to add additional rigidity to the structure. However, it is only an alternative or supplemental means since the hydraulic cylinders, if properly designed, have normally more than the required rigidity and strength to support the roof-lid assembly 26 in an upright position when used in the station wagon combination.

To actuate the hydraulic engines suitable power lines 112, supplying hydraulic fluid under pressure from a hydraulic pump and control means on the dash of the automobile (not shown) are provided.

In operation, at the desire of the occupants, the hydraulic pump (not shown) is actuated and the fluid under suitable pressure is forced through the lines 112 to the cylinders 100, 102, 104 and 106 respectively. The pistons 108 within their respective cylinders are actuated and upwardly urged. Since these are suitably fixed to the roof-lid assembly 26, they carry upwardly the roof-lid 26 until it is restrained from further movement by the limiting means built within the design of the hydraulic engines. At this stage, the ledge 22 and recess 30 on the forward edge 24 of the roof-lid 26 become engaged respectively with the ledge 28 and recess 20 in the roof 16 of the automobile body 10. Various means can be employed to limit the upward movement or to retain the cylinders in their extended position. These are well known to the art and individually do not form a part of this invention. With roof-lid assembly in the upright position a station wagon is created. The tail gate suitably hinged can be opened to provide entry and egress through the rear. Likewise, the windows can be opened to provide automatically suitable ventilation or closure against inclement weather.

In the illustration suitable strut members 114 are provided to equalize the stresses and strengthen the roof-lid structure but these are merely design adaptations that one skilled in this art can readily improvise to solve prospective structural requirements of the automobile body.

When the roof-lid assembly 26 is lowered, the respective ribs or ledges on the ends and sides thereof fit into and mate with their respective seals within the corresponding recesses to form therewith a tight fit. Likewise, the rear trunk door 42, which is hinged to the floor of the trunk, is locked and incapable of being opened unless the roof-lid assembly 26 is partially opened. Accordingly, I also provide a unique and foolproof means to prevent the breaking in and theft of valuables, parcels or the like from the trunk.

Though for sake of brevity and clarity only the preferred embodiment is illustrated, nevertheless one skilled in this art can readily change the components and still be within the spirit of the principles underlying my invention as defined in the annexed claims.

I claim:

1. A combination passenger and station wagon tonneau characterized by its ready convertibility to either type comprising essentially, a passenger compartment and a storage compartment having a floor, a wall means intermediate the said passenger compartment and said storage compartment movable to permit ready access therebetween, said storage compartment comprising a movable upper portion and a fixed lower portion, means to substantially vertically elevate the movable upper portion of said storage compartment in close juxtaposition with said passenger compartment, means to fixedly lock said movable upper portion of said storage compartment in its elevated position whereby a substantially enlarged capacity is created within said storage compartment to act as a station wagon compartment, means comprising a tailgate hingedly affixed along its lowermost edge to the edge of the floor of said storage compartment, and a tongue and groove means in complementary juxtaposition about the perimeter of the fixed lower portion of the said storage compartment, said tailgate, and the underside of said movable upper portion whereby when the upper portion is set down on the top side of said lower portion of the storage compartment and said tailgate the said tongue and groove means is interengaged to fixedly lock the said tailgate.

2. A combination passenger and station wagon tonneau characterized by its ready convertibility to either type comprising essentially, a passenger compartment and a storage compartment having a floor, a wall means intermediate the said passenger compartment and said storage compartment movable to permit ready access therebetween, said storage compartment comprising a movable upper portion and a fixed lower portion, means to substantially vertically elevate the movable upper portion of said storage compartment in close juxtaposition with said passenger compartment, means to fixedly lock said movable upper portion of said storage compartment in its elevated position whereby a substantially enlarged capacity is created within said storage compartment to act as a station wagon compartment, means comprising a tailgate hingedly affixed along its lowermost edge to the edge of the floor of said storage compartment, said tailgate when in the elevated position being engageable by said upper portion on lowering of the same in fixedly locked interengagement so that the same is incapable of being opened unless the upper portion of the storage compartment is partially raised.

3. The combination tonneau of claim 2 further characterized in that a sealing means about the perimeter of the upper portion of said storage compartment is engageable with a respective complementary means about the perimeter of the lower portion of said storage compartment.

4. The combination tonneau of claim 2 characterized in that lock and seal means on the edges of the upper portion of said storage compartment engage the rear of said passenger compartment when the upper compartment is in an elevated position, and second means to lock and seal the edges of the upper portion of said storage compartment to the lower portion of the storage compartment when the upper portion is in a lower position whereby a weatherproof joint is formed when said upper portion is elevated as well as when it is in its lowered position.

References Cited by the Examiner
UNITED STATES PATENTS

| | | | |
|---|---|---|---|
| 1,474,283 | 11/23 | Nystrom | 296—37 |
| 1,800,514 | 4/31 | Dupre | 296—99 |
| 3,053,562 | 9/62 | Farber | 296—26 |
| 3,061,358 | 10/62 | Lien | 296—26 |

BENJAMIN HERSH, *Primary Examiner.*
A. HARRY LEVY, *Examiner.*